United States Patent [19]
Cullen et al.

[11] Patent Number: 5,325,456
[45] Date of Patent: Jun. 28, 1994

[54] OPTICAL ISOLATOR IN AN OPTICAL FIBER FEEDTHROUGH

[75] Inventors: Robert R. Cullen, Centerville, Del.; Joseph A. Perrotto, Landenberg; David R. Thompson, West Chester, both of Pa.

[73] Assignee: E.I. Du Pont de Nemours and Company, Wilmington, Del.

[21] Appl. No.: 834,440

[22] Filed: Feb. 12, 1992

[51] Int. Cl.⁵ .................................................. G02B 6/42
[52] U.S. Cl. .................................. 385/138; 359/494; 372/108; 385/92; 385/94
[58] Field of Search .......................... 385/138, 88-94; 359/281, 282, 283, 484, 494; 372/29, 108, 109

[56] References Cited

U.S. PATENT DOCUMENTS

| | | | |
|---|---|---|---|
| 4,119,363 | 10/1978 | Camlibel et al. | 350/96.20 |
| 4,615,031 | 9/1986 | Eales et al. | 372/36 |
| 4,701,011 | 10/1987 | Emkey et al. | 350/96.18 |
| 4,826,276 | 5/1989 | Abbott et al. | 350/96.20 |
| 4,844,573 | 7/1989 | Gillham et al. | 385/92 |
| 4,865,410 | 9/1989 | Estrada et al. | 350/96.20 |
| 5,037,174 | 8/1991 | Thompson | 385/33 |
| 5,046,798 | 9/1991 | Yagiu et al. | 385/92 |
| 5,074,682 | 12/1991 | Uno et al. | 385/93 |

OTHER PUBLICATIONS

Electronics Times, "Splendid isolators light on a Big Answer to reflection", Nov. 21, 1991.

*Primary Examiner*—Frank Gonzalez

[57] ABSTRACT

An optical fiber feedthrough is characterized by an isolator disposed completely within the feedthrough tube.

10 Claims, 7 Drawing Sheets

STRIP AND CLEAN    50mm    12L-2    9/125 S.M. FIBER

FIG.5B

LENS 12E    29mm    12L-2

FIG.5C

12L-2    FARFIELD TEST

FIG.5E 60    12I-2    PIECE OF BUFFER    12L-2

OPTICAL ISOLATOR IN AN OPTICAL FIBER FEEDTHROUGH

BACKGROUND OF THE INVENTION

1. Field of the Invention

The present invention relates to an optical isolator and, in one application, to an optical fiber feedthrough assembly having an isolator therein.

2. Description of the Prior Art

An isolator is an optical device operative to permit passage of light in one direction but to prevent the passage of light in the opposed direction. The central component of an isolator is a material, typically a crystalline material, which is capable of rotating the plane of polarization of light passing through in response to the application of an external field, typically a magnetic field. On each facial surface of the crystal is provided a polarizer. Each polarizer has a different plane of polarization associated with it.

Early optical isolator technology used a ferromagnetic rare earth garnet material such a yttrium iron garnet material. Presently, however, the material of choice for an isolator is an epitaxially grown bismuth iron garnet ("BiG") material. Isolator technology is discussed in Electronic Times, 21 Nov. 1991.

Light is coupled into and from the polarizer surfaces of the isolator using a lens. U.S. Pat. No. 4,701,011 (Emkey et al.) discloses an arrangement whereby a graded index optical fiber may be mounted to the end of a single mode fiber to serve as a lens.

Presently available opto-electronic apparatus utilize active opto-electronic devices, such as solid state lasers or diodes. The active opto-electronic device is mounted within a suitable sealed housing. Light impulses emitted from or directed onto lasers or diodes, respectively, are carried between linked transmitters, receivers, or other opto-electronic apparatus on optical fiber links. The passage of the optical fiber into the respective housing of the opto-electronic apparatus is facilitated using a structure known as a feedthrough assembly. The housing and feedthrough provide a degree of environmental isolation between the inside and outside of the housing. Representative opto-electronic apparatus and/or feedthrough assemblies are disclosed in U.S. Pat. No. 4,119,363 (Camlibel), U.S. Pat. No. 4,615,031 (Eales), U.S. application Ser. No. 07/453,831, filed Dec. 19, 1989 (now abandoned), U.S. Pat. No. 5,177,806, U.S. Pat. No. 4,826,276, U.S. Pat. No. 4,865,410, and U.S. application Ser. No. 07/725,777, filed Jun. 17, 1991 (now abandoned).

It is known to use an isolator to prevent back reflections of light from affecting active opto-electronic components. However, the relatively large size of presently available isolators and, owing to the high material cost, their relatively high expense (on the order of $2000) are perceived disadvantages attendant with their use.

In view of the foregoing it is believed advantageous to provide a miniature isolator, and in particular, an isolator element sized for receipt within a feedthrough assembly.

SUMMARY OF THE INVENTION

In a first aspect the present invention relates to an optical fiber feedthrough member for feeding an optical fiber through a wall of a housing. The feedthrough has a tube with an open end with the fiber extending through the tube. A seal for sealing the fiber to the tube is disposed a first distance from the open end of the tube. The fiber within the tube is interrupted at a second, greater, distance along the fiber from the open end of the tube thereby to define first interrupted end and and a second interrupted end. An isolator element is disposed completely within the tube, with the isolator element forming part of a continuous optical path between the first and the second interrupted ends of the fiber. Each endface has, in the preferred case, an anti-reflection coating provided thereon.

A lens is disposed on each of the first and second interrupted ends of the fiber. In the preferred case the lens is formed from a graded index optical fiber fusion spliced to the interrupted end of the fiber. Each lens has an numerical aperture in the range from about 0.15 to about 0.19, preferably about 0.18.

Further in accordance with the present invention an isolator support member in the form of a cylindrical glass member having a capillary bore extending therethrough is received within and supports the isolator element within the tube. The cylindrical glass member has a central portion thereof removed to define an isolator support area therein. The capillary bore on each side of the removed central portion defines first and second passages respectively receiving the first and second interrupted lensed lengths of fiber.

In another aspect the present invention may be implemented in the form of an in-line dual-pigtailed optical isolator arrangement.

BRIEF DESCRIPTION OF THE DRAWINGS

The invention will be more fully understood from the following detailed description thereof taken in connection with the accompanying drawings, which form a part of this application and in which.

DETAILED DESCRIPTION OF THE INVENTION

Throughout the following detailed description similar reference numerals refer to similar elements in all figures of the drawings.

Figure 1:
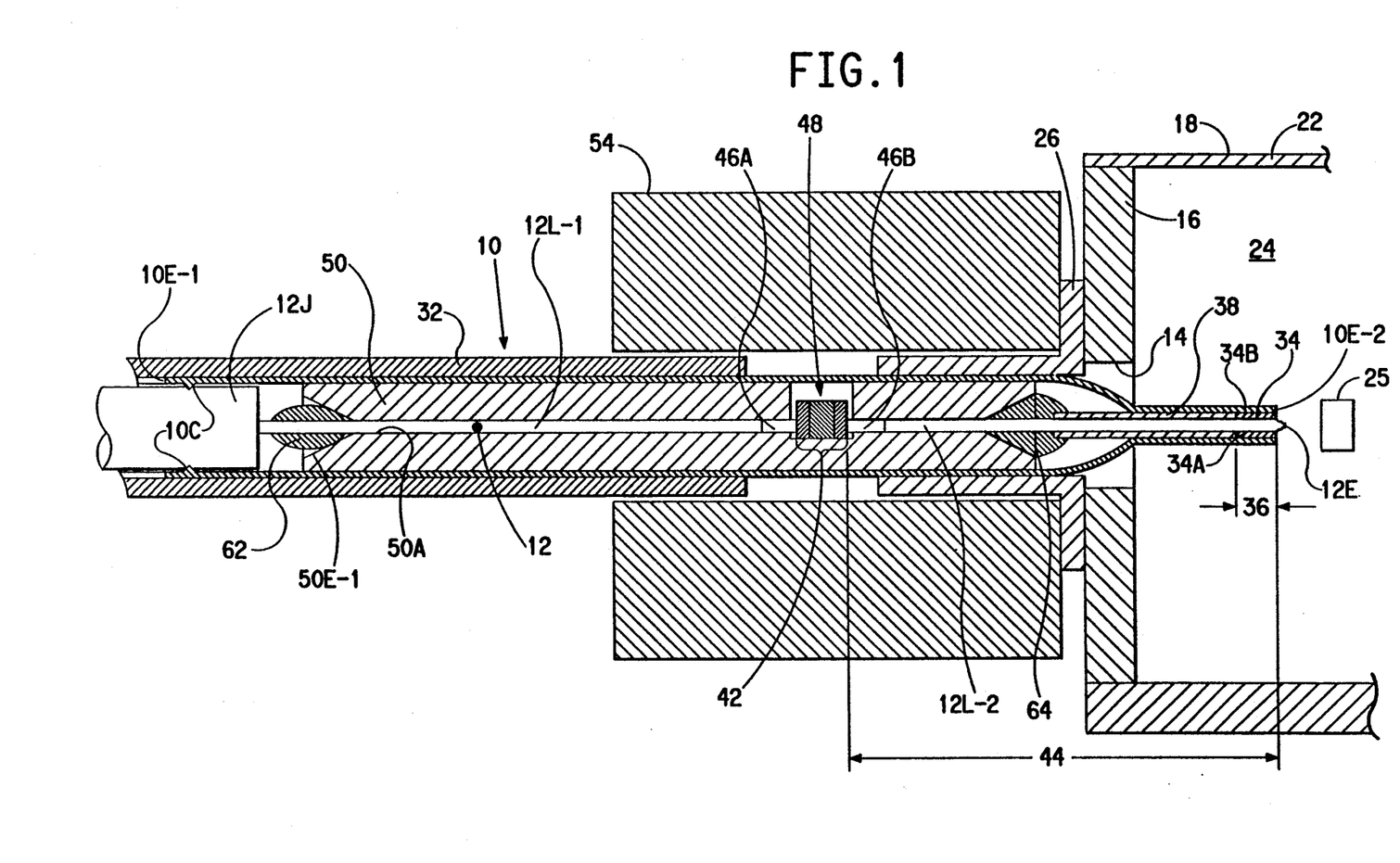
FIG. 1 is a side elevational view in section of an assembled feedthrough 10 having an isolator therein in accordance with the present invention.

With reference to FIG. 1 shown in side elevation and entirely in section is a feedthrough generally indicated by the reference character 10 in accordance with the present invention. The feedthrough 10 carries an optical fiber 12, preferably a single mode optical fiber, having a lensed end 12E thereon. Preferably, the end 12E has an aspherical lens thereon formed in the manner disclosed in U.S. Pat. No. 5,037,174.

The feedthrough 10 is operative to convey the optical fiber 12 through an opening 14 provided in the sidewall 16 of a housing 18 for an opto-electronic component. The feedthrough 10 thus provides an optical path into the housing 18. The housing 18, which is only partially illustrated in FIG. 1, includes a base 20 and a cover 22, which collectively enclose a volume 24. The housing 18 is preferably fabricated from a ferrous material. An opto-electronic device, such as a narrow line width semiconductor laser source of the distributed feedback type (diagrammatically illustrated at reference character 25), is suitably mounted and supported within in the volume 24. In a preferred arrangement the opto-electronic device may itself be received within a second package that is mounted in the volume 24. Such an arrangement is disclosed in U.S. Pat. Nos. 07/453,831, filed Dec. 19, 1989 (now abandoned), U.S. Pat. No. 5,177,806, and copending U.S. application Ser. No. 07/725,777, filed Jun. 17, 1991 (now abandoned). The feedthrough 10 is secured to the wall 16 by an annular collar 26. A mounting arrangement for securing the feedthrough to the housing 18 and to a submodule mounted therewithin is disclosed in U.S. Pat. No. 4,865,410.

Figure 2:
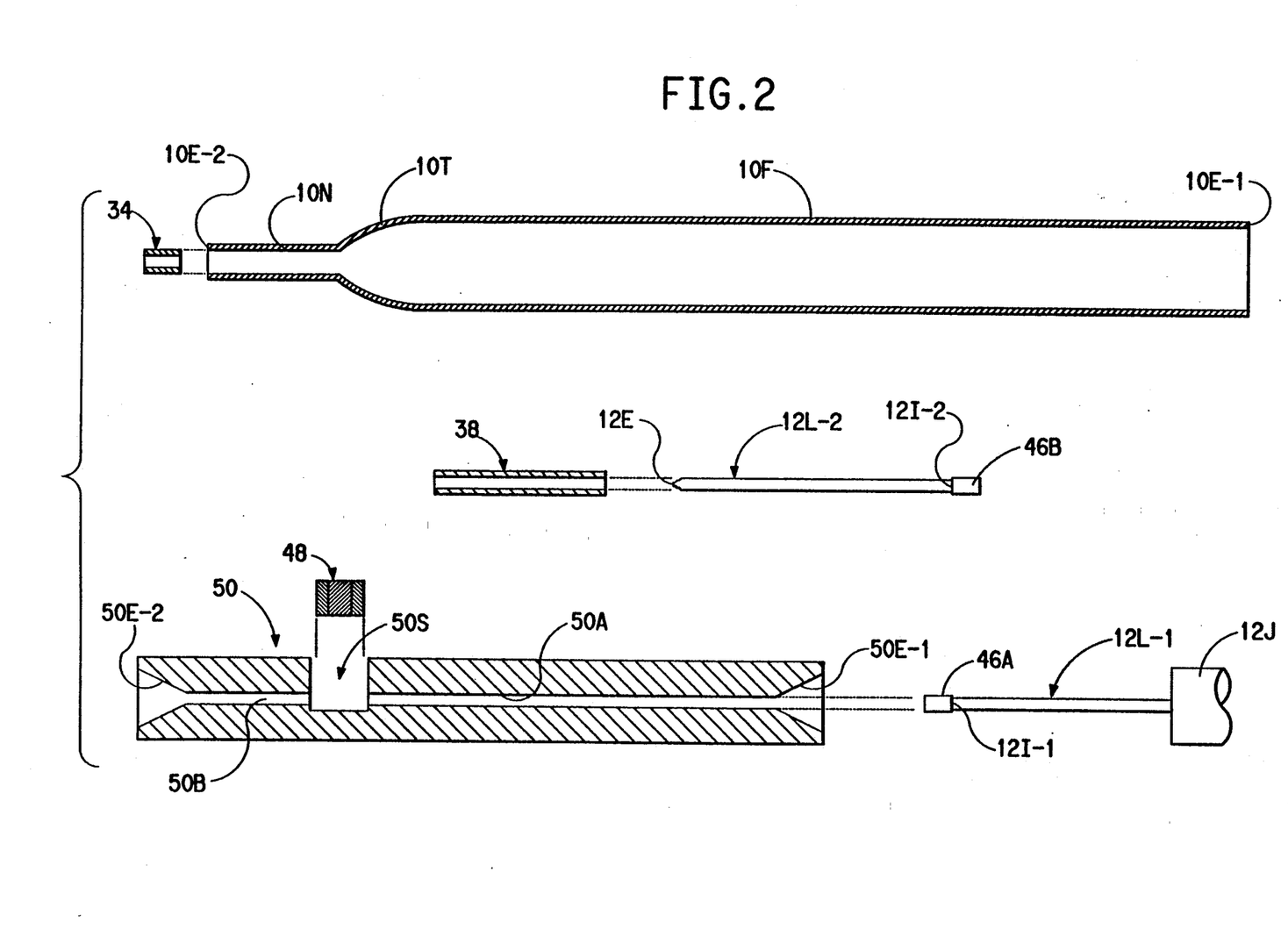
FIG. 2 is an exploded view of the feedthrough shown in FIG. 1.

As is shown in FIGS. 1 and 2 the feedthrough 10 is, in its preferred configuration, a tubular member having open ends 10E-1 and 10E-2 between which lie an enlarged region 10F, a tapered transition region 10T, and relatively narrower neck region 10N. Preferably, the feedthrough 10 is formed from a nonmagnetic metallic material such as stainless steel to facilitate its mounting to the housing 18, although any suitable material consistent with the application may be used for the feedthrough 10.

The fiber 12 extends centrally and axially through the feedthrough 10 from the first end 10E-1 to and slightly past the second end 10E-2. The enlarged section 10F of the feedthrough is crimped, as at 10C, or otherwise suitably attached to the jacket 12J of the fiber 12. The jacket 12J is removed from the portion of the fiber 12 extending within the remaining length of the feedthrough 10. A shrink tube 32 or the like may be disposed to overlie both the enlarged region 10F of the feedthrough 10 and the jacketed portion 10J of the fiber 12 trailing therefrom.

An annular seal 34 is located a first distance 36 (typically in close-adjacency or in next-adjacency) to the open end 10E-2 of the feedthrough 10. The annular seal 34 is used to define a sealed interface 34A with the fiber 12 and a sealed interface 34B with the interior surface of the neck portion 10N, thereby to hermetically close the end 10E-2 of the feedthrough 10. A suitable seal is disclosed in copending U.S. applications Ser. No. 07/453,831, filed Dec. 19, 1989 (now abandoned) and U.S. Pat. No. 5,177,806. The portion of the fiber 12 immediately behind the annular seal 34 is supported by a fiber support arrangement in the form of a rigidizing member 38, such as a quartz tube. The fiber support arrangement is disclosed in U.S. Pat. No. 4,826,276.

In accordance with the present invention the stripped portion of the fiber 12 extending through the feedthrough 10 is interrupted, as at the region 42, thereby to define a first length 12L-1 and a second length 12L-2 of optical fiber. The length 12L-1 of the fiber 12 has the interrupted end 12I-1 thereon and will, in a manner to be discussed in connection with FIG. 4, become a pigtailed length of fiber. The fiber length 12L-2 has the interrupted end 12I-2 thereon, and becomes a dual-lensed length of fiber in a manner to be discussed in connection with FIG. 5 (Sheets 1 and 2). As is seen from the FIG. 1 the region 42 is located a distance 44 (greater than the distance 36) from the open end 10E-2 of the feedthrough. The interruption of the fiber 12 is thus preferably placed within the enlarged region 10F of the feedthrough 10. Each interrupted end 12I-1, 12I-2 of the fiber 12 has a respective lens 46A, 46B provided thereon.

In accordance with the present invention an isolator element 48 is disposed completely within the feedthrough 10. The isolator element 48 forms part of a continuous optical path between the first and second interrupted ends 10I-1, 10I-2, respectively, of the fiber 10.

The isolator element 48 is mounted on and supported by an isolator support member 50 that is itself received within the tubular feedthrough 10. The support member 50 is dimensioned to fit closely within the enlarged region 10F of the feedthrough 10. As will be described the support member 50 is formed with an isolator support area 50S defined thereon and with a first passage 50A and a second passage 50B extending therethrough. The isolator support area 50S receives the isolator element 48. The first and a second passages 50A, 50B communicate with the isolator support area 50S. The respective first and second ends 50E-1, 50E-2 of the support member 50.

The isolator element 48 is actuated by an actuator 54, such as an annular magnetic actuator disposed about the enlarged region 10F of the feedthrough 10. The actuator 54 is secured to the housing 18 by inherent magnetic attraction to the wall 16. Alternatively a suitable adhesive (such as an epoxy) may be used to discourage removal of the actuator 54 from the housing 18.

Figure 3:
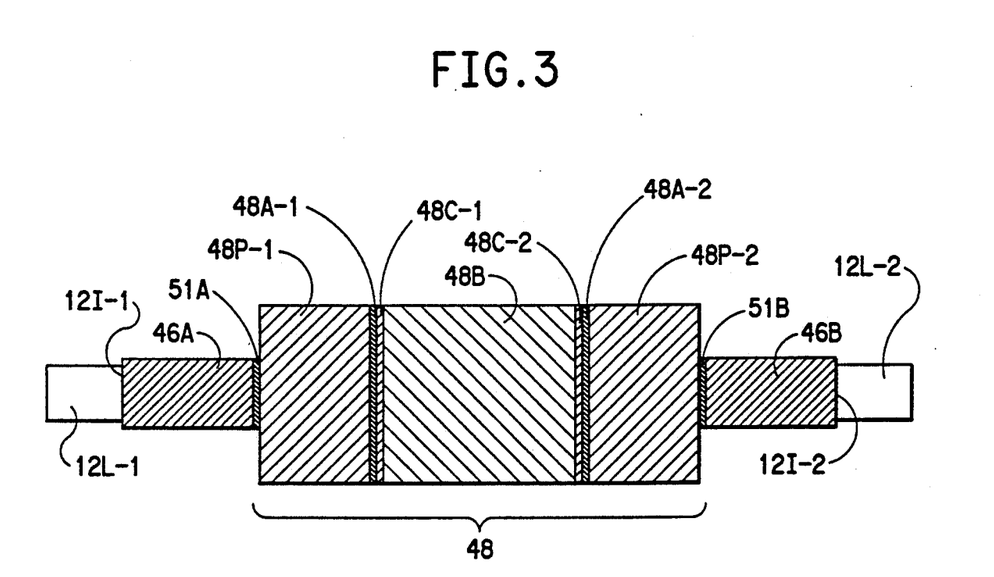
FIG. 3 is a side elevational view in section of the isolator element shown in FIGS. 1 and 2.

As may be best seen from FIG. 3 the isolator element 48 is formed as a three-layer sandwich assembly. The central layer of the isolator element 48 serves to rotate the plane of polarization of light. Any suitable material, such as a crystalline material, may be used for this purpose. In the preferred case the central layer of the isolator element 48 is a bismuth iron garnet ("BiG") crystal wafer 48B. The outside layers of the isolator element 48 are formed by polarizers 48P-1, 48P-2. The polarizers 48P-1, 48P-2 are secured to the major surfaces of the wafer 48B by a suitable adhesive layer 48A-1, 48A-2, while the lenses 46A, 46B are respectively secured to a major surface of each polarizer 48P-1, 48P-2 by a respective layer of adhesive 51A, 51B.

Although any appropriate crystal may be used, in the preferred instance the crystal 48B is derived from an LPE Garnet Film Optical isolator wafer [chemically, $(TbBi)^3Fe_5O_{12}$], sold by the Non-Ferrous Metals Division of Sumitomo Corporation of America, New York, N.Y. The crystal 48B has a rotation angle of 45 degrees, $+/-1$ degree, for the center wavelength desired. To achieve high yields in manufacture the wafer from which the crystal 48B is derived must have rotation uniformity across the entire wafer and a transmittance of greater than approximately 90%. A preferred center wavelength is 1550 nanometers, although the wavelength of 1300 nanometers is not uncommon.

To obtain a 0.01% or lower reflectivity from the isolator 48 for the desired center wavelength the major surfaces of the crystal 48B should be covered with a three-layer, high quality anti-reflection coating 48C-1, 48C-2, respectively. A suitable coating may be provided by JML Optical Industries, Hauppauge, N.Y. Each coating 48C-1, 48C-2 is designed to index-match the crystal 48B to the adjacent adhesive layer 48A-1, 48A-2, as the case may be. The coatings 48C-1, 48C-2 are preferably applied by ion deposition.

Although other polarizers may be used, the preferred polarizers 48P-1, 48P-2 are each formed from the material manufactured by Corning Incorporated, Corning, N.Y., and sold as Corning Code 8612 Polarcor ™ polarizers. One of the polarizers exhibits an edge angle of 45° while the edge angle of the other polarizer is 0°. As noted the polarizers 48P-1, 48P-2 are attached to the coated major surfaces of the crystal 48B by a respective layer an index-matching adhesive 48A-1, 48A-2. Preferably, the adhesive is UV curable epoxy adhesive manufactured by Dymax Corporation, Toffington, Conn., and sold as Lightweld #304 adhesive.

The isolator 48 is fabricated by securing the wafers of polarizer material (each approximately $10 \times 10 \times 2$ mm) to the major surfaces of the crystal (approximately $10 \times 10 \times 0.5$ mm) using the last-mentioned adhesive. The resulting assembly is cured and thereafter diced into the isolator elements 48 used in the feedthrough 10. The dicing is accomplished using a diamond dicing saw. Dicing to 0.35 mm squares cut with a 0.07 mm kerf blade produces approximately 410 isolator elements 48 useful for a feedthrough in accordance with the present invention.

The isolator support member 50 is preferably implemented using a micro-capillary formed from borosilicate glass. A suitable micro-capillary is manufactured and sold by Nippon Electric Glass as model E901-EA. The isolator support area 50S is formed in the member 50 by cutting an offset slot in the capillary. Inasmuch as the capillary serves to align axially the fibers 12L-1, 12L-2 the dimensions of the passages 50A, 50B (defined by the bore of the capillary) should be close to the outer diameter dimension of the lenses 46A, 46B on the lengths 12L-1, 12L-2 of fiber extending therethrough. As an alternative it may be desirable in some instances to utilize a connector comprised of fiber positioning devices of the kind disclosed and claimed in copending U.S. application Ser. No. 07/753,277 (now abandoned) and Ser. No. 07/753,255 (now abandoned) to form the isolator support member 50.

The pig-tailed length 12L-1 of fiber is formed in the manner shown in FIG. 4. In step 4A a predetermined length of single mode optical fiber, such as that sold by Corning Incorporated, Telecommunications Products Division (typically 9 micrometer core/125 micrometer cladding o.d.) is stripped, cleaned and cleaved to a length sufficient to permit acceptance by a fusion splicing apparatus.

Figure 4A:
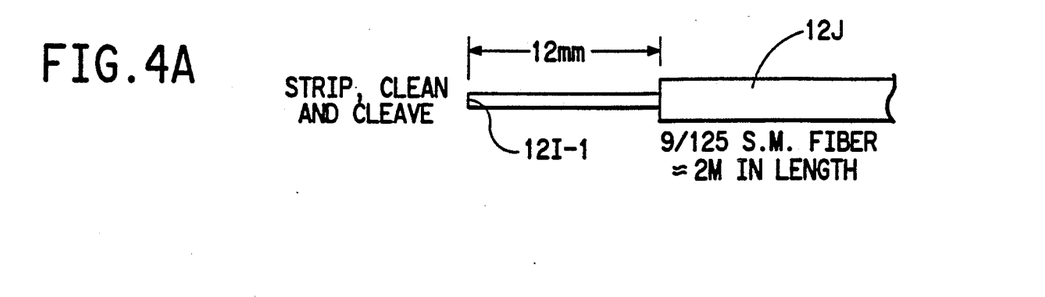
FIGS. 4A–4D are a stylized representation of the method steps involved in forming the pig-tailed length of optical fiber used in the feedthrough of the present invention.
Figure 4B:
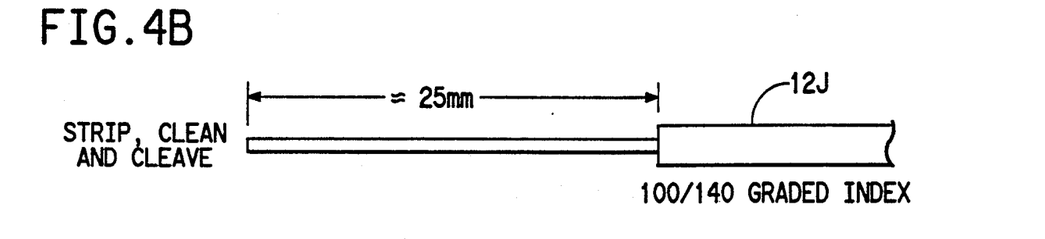

Similarly, in step 4B, a predetermined length of graded-index optical fiber is stripped, cleaned and cleaved to a length sufficient to permit acceptance by a fusion splicing apparatus. For the graded index optical fiber, the 100 micrometer core/140 micrometer cladding o.d. fiber sold by Spectran, Sturbridge, Mass., as SG320 fiber should be used. Preferably, the graded index fiber should have a numerical aperture as low as possible, with graded index fiber having a numerical aperture in the range from about 0.15 to about 0.19 being the most readily available. Standard commercial graded index fiber having a numerical aperture of about 0.27 may, however, be used.

Figure 4C:
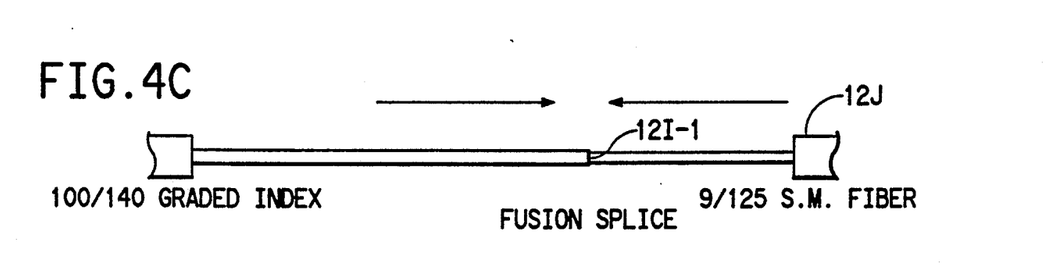

The single mode and graded index fibers are fusion spliced using a splicing apparatus sold by Fujikura Ltd., with care being exerted to maintain the axis of the cores of the fibers to within $+/-0.5$ micrometers of each other. The resultant structure is shown in FIG. 4C. U.S. Pat. No. 4,701,011 (Emkey et al.) discloses a fusion spliced graded index optical fiber mounted to the end of a single mode fiber.

Figure 4D:
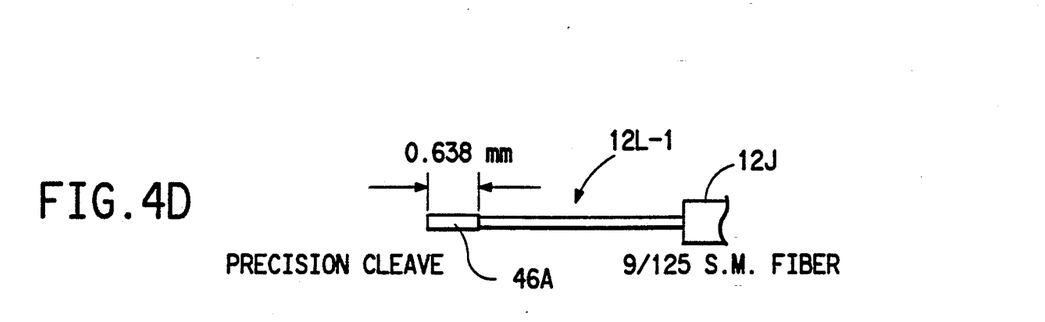

As seen in FIG. 4D, the lens 46A is formed by precision cleaving to leave a predetermined length of the graded index fiber on the end of single mode fiber. The remaining length of the graded index fiber is sized to closely equal one-quarter pitch of the center wavelength. This distance is determined by the numerical aperture of the graded index fiber. In the case of 1550 nanometers center wavelength and for a graded index fiber having a numerical aperture of 0.183, this distance is about 0.638 mm.

The formation of the dual lensed length 12L-2 of the fiber may be understood from FIG. 5 (Sheets 1 and 2). A length of the single mode fiber is stripped and cleaned (step 5A) and a lens is provided on the end 12E thereof (step 5B). Preferably, the lens 12E is an aspherical lens formed using the technique disclosed in U.S. Pat. No. 5,037,174. This patent is hereby incorporated by reference herein. A farfield test (step 5C) is performed to verify the uniformity of the lens and its ability to accept light. A farfield test is a means of characterizing the lens quality and the divergence angle.

Figure 5A:
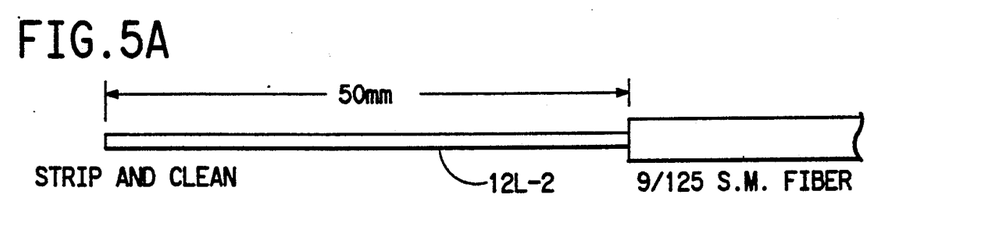
FIGS. 5A–5I are a stylized representation of the method steps involved in forming the lensed length of optical fiber used in the feedthrough of the present invention.
Figure 5B:
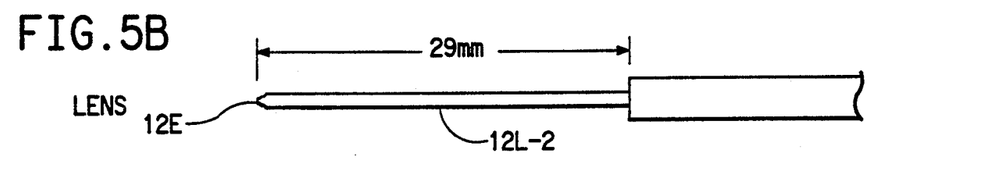
Figure 5C:
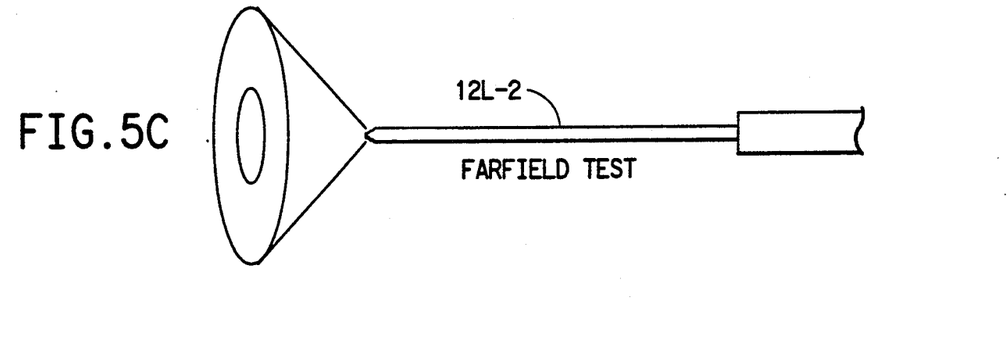
Figure 5D:
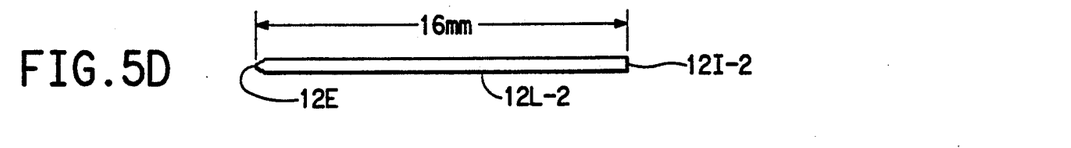
Figure 5E:
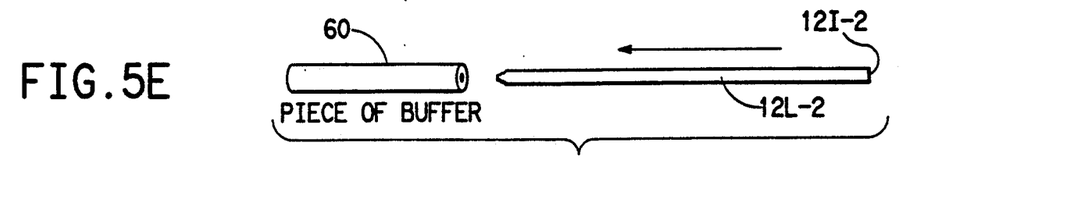

In step 5D a length of the lensed single mode fiber 12L-2 is cleaved to a predetermined length and inserted into a protective buffer 60. The buffer 60 serves to protect the length 12L-2 in the splicing apparatus.

Figure 5F:
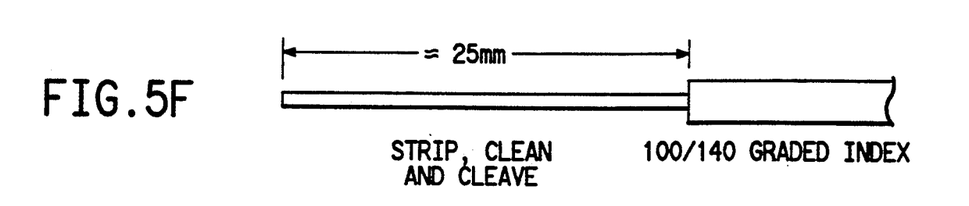
Figure 5G:
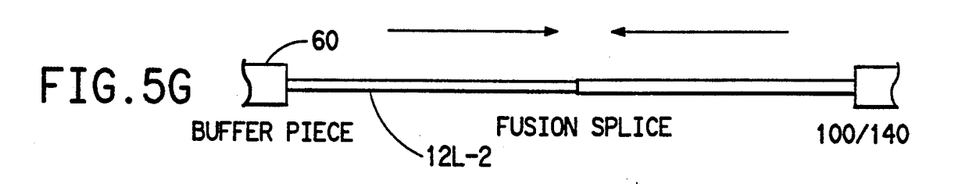
Figure 5H:
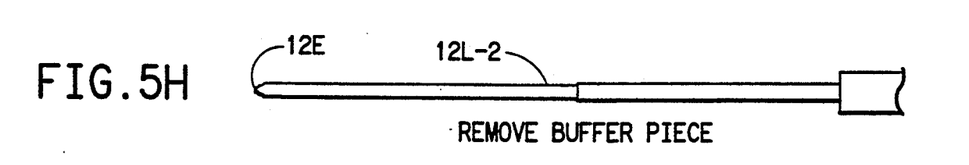
Figure 5I:
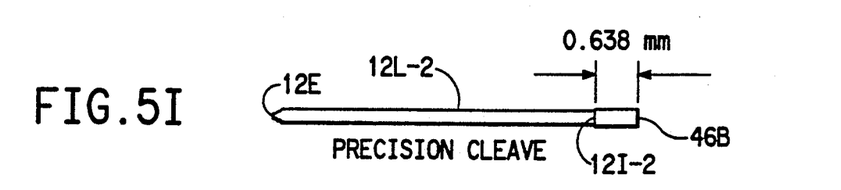

In step 5F a length of the graded index fiber is stripped, cleaned and cleaved (similar to the step 4B) and a fusion spliced to the lensed length 12L-2 of the single mode fiber (step 5G). From the resulting structure (FIG. 5H) a predetermined length of the graded index fiber is precision cleaved, thereby to define the lens 46B.

Reverting to FIGS. 1 and 2 the formation of the feedthrough assembly 10 may be understood from the following discussion.

The pigtailed portion 12L-1 of the fiber 12 is inserted into the first passage 50A of the isolator support member 50. The insertion proceeds until the lensed end 46A lies within a close distance (e.g., about one millimeter) of the isolator support area 50S at the end of the passage 50A. Next, the dual-lensed portion 12L-2 of the fiber 12 is inserted into the second passage 50B, until the lensed end 46B lies within a close distance (e.g., about one millimeter) of the isolator support area 50S. The isolator 48 is introduced into the isolator support area 50S of the member 50, with the major surfaces of the polarizers 48P-1, 48P-2 respectively presented toward the lenses 46A, 46B. The ends of the lenses 46A, 46B are gently butted to the major surfaces of the polarizers 48P-1, 48P-2, respectively, and a sparse drop of a low viscosity epoxy is applied to the surfaces of the isolator. Once an even and complete coverage is noted, including the wicking of the epoxy along the outer surface of the fiber lengths 12L-1, 12L-2 within the passages 50A, 50B of the support member 50, the epoxy is cured. This action forms the adhesive layer 50A, 50B (FIG. 3). Preferably, a U.V. light curable epoxy that is index matched to the lens 46A, 46B and the surface of the respective polarizer 48P-1, 48P-2, respectively, is preferred. Suitable for use as the low viscosity epoxy is that sold by Dymax Corporation, as Lightweld #304 adhesive.

Next, a drop of higher viscosity epoxy is applied to the ends 50E-1, 50E-2 of the support member 50. The support tube 38 is inserted over the dual-lensed end length 12L-2 of the fiber and inserted into the epoxy. When the higher viscosity epoxy is cured the joint 62 (FIG. 1) is defined between the jacket 12J of the fiber and the end 50E-1 of the support member 50 and the joint 64 (FIG. 1) is defined between the support member 38 and the end 50E-2 of the support member 50. The U.V. light curable epoxy sold by Dymax Corporation, as Lightweld #305 adhesive is preferred as the high viscosity epoxy.

The resulting structure is inserted into the end 10E-1 of the feedthrough 10 and then crimped, at 10C. The fiber 12 is then sealed to the feedthrough 10 near the end 10E-2 as disclosed in copending U.S. application Ser. No. 07/453,831, filed Dec. 19, 1989 (now abandoned) and copending U.S. Pat. No. 5,177,806.

After aligning and fixing (as by soldering) of the collar 26 to the wall 16 of the housing 18 the actuator 54 is mounted.

Figure 6:
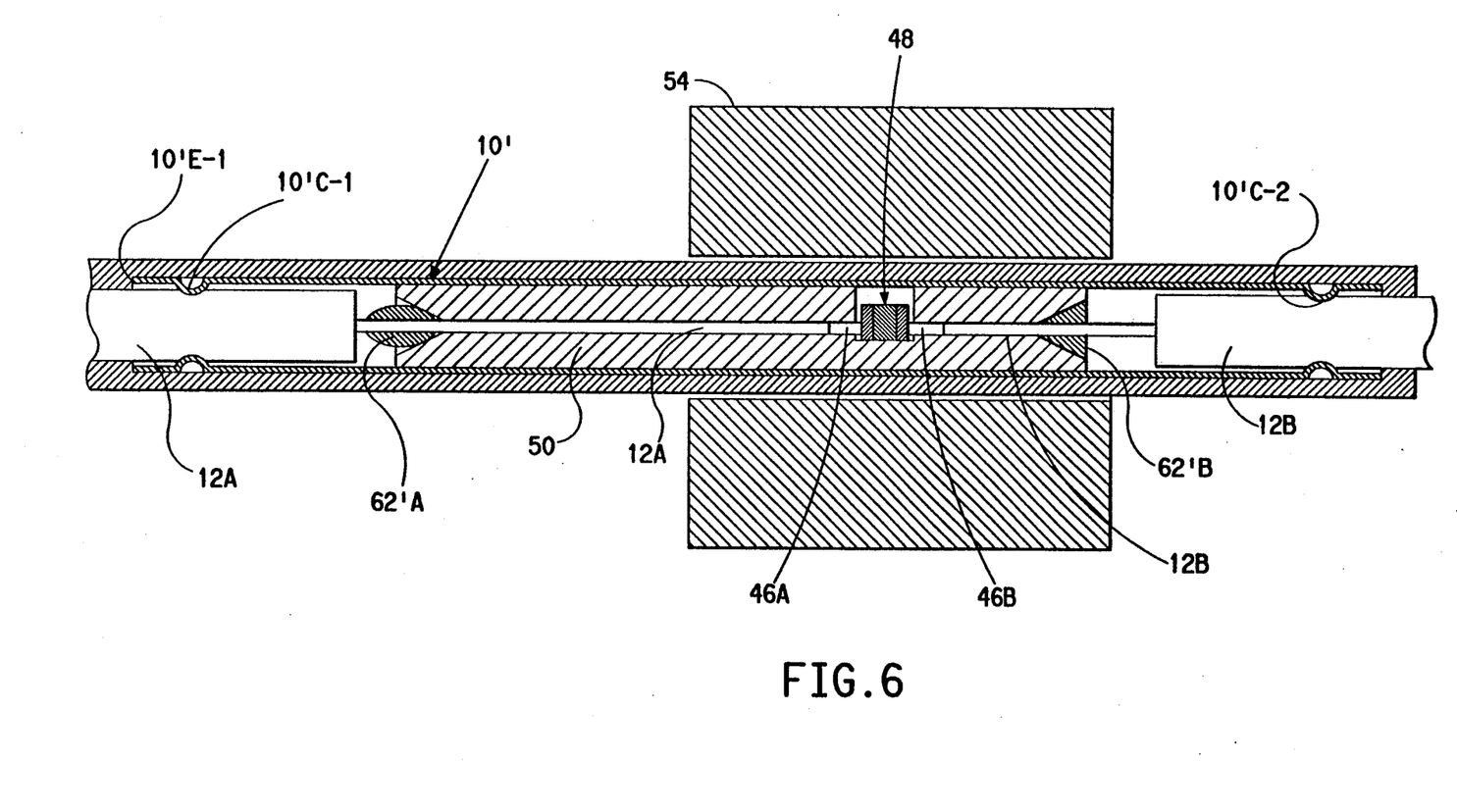
FIG. 6 is a side elevational view of an in-line dual-pigtailed optical isolator incorporating the teachings of the present invention.

From the foregoing it should be appreciated that present invention may be used in the context of a dual-pigtailed arrangement such as is illustrated in FIG. 6. In this arrangement a uniform diameter tube 10' received the isolator support member 50. A fiber 12A, 12B is inserted into each end 10'E-1, 10'E-2 of the tube 10' and crimped, as at 10'C-1, 10'C-2. The masses 62'A, 62'B of epoxy hold the fibers 12A, 12B at the ends 50E-1, 50E-2 of the member 50. A shrink tube 32 may be disposed over the entire assembly. The actuator 54 is held in position over the isolator 48 by a second shrink tube (not shown), or by epoxy.

Those skilled in the art, having the teachings of the present invention as hereinabove set forth, may effect numerous modifications thereto. It should be understood that these and such modifications lie within the contemplation of the present invention, as defined by the appended claims.

What is claimed is:

1. In an optical fiber feedthrough member for feeding an optical fiber through a wall of a housing, the feedthrough having a tube with an open end, the fiber extending through the tube, a seal a first distance from the open end of the tube for sealing the fiber to the tube, the improvement comprising:
    the fiber within the tube being interrupted a second, greater, distance therealong from the open end of the tube thereby to define first interrupted end and a second interrupted end,
    an isolator element disposed completely within the tube, the isolator element forming part of a continuous optical path between the first and second interrupted ends of the fiber.

2. The apparatus of claim 1 wherein the improvement further comprises:
    a lens disposed on each of the first and second interrupted ends of the fiber.

3. The apparatus of claim 2 wherein each lens comprises a graded index optical fiber fusion spliced to the interrupted end of the fiber.

4. The apparatus of claim 1 wherein the isolator element itself comprises a bismuth-iron-garnet isolator crystal, the crystal having first and second endfaces thereon,
    each endface having an anti-reflection coating thereon.

5. The apparatus of claim 1 wherein the improvement further comprises:
    an isolator support member disposed within the tube, the support member having an isolator support area defined thereon and a first and a second passage extending therethrough, the first and a second passages communicating with the isolator support area,
    the isolator element being mounted in the isolator support area, a portion of the fiber the first and second interrupted ends respectively extending through the first and second passages in the isolator support member.

6. The apparatus of claim 5 wherein the isolator support member comprises a cylindrical glass member having a capillary bore extending therethrough, the cylindrical glass member having a central portion thereof removed to define the isolator support area therein, the capillary bore on each side of the removed central portion defining the first and second passages.

7. The apparatus of claim 3 wherein each lens has an numerical aperture in the range from about 0.15 to about 0.19.

8. The apparatus of claim 7 wherein each lens has an numerical aperture of about 0.18.

9. An optical isolator comprising;
    an isolator support member comprising a cylindrical glass member having a capillary bore extending therethrough, the cylindrical glass member having a portion thereof removed to define an isolator support area therein, the capillary bore on each side of the removed central portion communicating with the isolator support area; and
    an isolator element mounted in the isolator support area.

10. An optical source comprising:
    a narrow line width semiconductor laser mounted in a housing,
    an optical path provided by a fiber feeedthrough into the housing, wherein the fiber feedthrough includes an optical isolator, the isolator itself comprising;
    an isolator support member comprising a cylindrical glass member having a capillary bore extending therethrough, the cylindrical glass member having a portion thereof removed to define an isolator support area therein, the capillary bore on each side of the removed central portion communicating with the isolator support area; and
    an isolator element mounted in the isolator support area.

* * * * *